United States Patent [19]

Billingsley

[11] 4,209,270
[45] Jun. 24, 1980

[54] PIPE CONNECTOR APPARATUS AND METHOD

[75] Inventor: Lloyd E. Billingsley, Houston, Tex.

[73] Assignee: HydroTech International, Inc., Houston, Tex.

[21] Appl. No.: 970,791

[22] Filed: Dec. 18, 1978

Related U.S. Application Data

[62] Division of Ser. No. 788,159, Apr. 18, 1977, Pat. No. 4,142,739.

[51] Int. Cl.² ............................................. F16L 21/08
[52] U.S. Cl. ................................. 405/195; 29/402.11; 138/99; 166/364; 405/169
[58] Field of Search ................ 405/195, 154, 158–166, 405/169, 170, 168; 138/97–99; 166/207, 364; 285/322, DIG. 13, 15, 31, 323, 18, 145, 100, 24; 29/401 F, 401 C

[56] References Cited

U.S. PATENT DOCUMENTS

| | | | |
|---|---|---|---|
| 1,194,236 | 8/1916 | Richards | 285/DIG. 13 X |
| 2,286,751 | 6/1942 | Merrill | 138/99 |
| 2,651,329 | 9/1953 | Flowler | 138/97 |
| 3,053,553 | 9/1962 | Browning | 285/DIG. 13 X |
| 3,393,926 | 7/1968 | Arnold | 285/18 |
| 3,695,634 | 10/1972 | White | 285/31 |
| 3,704,033 | 11/1972 | Arnold | 285/322 X |
| 3,713,675 | 1/1973 | White | 285/322 X |
| 3,977,702 | 8/1976 | White et al. | 285/18 |
| 3,986,728 | 10/1976 | Marsh | 285/18 |
| 3,999,782 | 12/1976 | Shotbolt et al. | 285/DIG. 13 X |
| 4,006,921 | 2/1977 | Mohr | 285/323 X |
| 4,124,231 | 11/1978 | Ahlstone | 285/322 X |

Primary Examiner—Dennis L. Taylor

[57] ABSTRACT

Apparatus for connecting a cylindrical first member to a second member which may comprise: a tubular body attachable to the second member and adapted to receive one end of the first member; a gripping assembly carried by the body and movable from a radially expanded position, in which one end of the first member may be axially received and displaced from the body, to a radially contracted position gripping the exterior of the first member and preventing its axial displacement from the body; an annular seal assembly carried by the body and movable from a relaxed position, in which one end of the first member may be axially received therein, to a compressed position, sealingly engaging the first member; and an actuating assembly carried by the body and operable to move the gripping and seal assemblies to their contracted and compressed positions, respectively.

3 Claims, 5 Drawing Figures

PIPE CONNECTOR APPARATUS AND METHOD

This is a division of application Ser. No. 788,159, filed Apr. 18, 1977 now U.S. Pat. No. 4,142,739.

BACKGROUND OF THE INVENTION

1. Field of the Invention

The present invention pertains to pipe connector apparatus and methods for installing the same. More specifically, it pertains to apparatus and methods suitable for connecting pipes in particularly difficult environments, such as subsea ones. In particular, the present invention pertains to connector apparatus for repairing damaged pipe risers at offshore oil and/or gas platforms.

2. Description of the Prior Art

In offshore production of oil and/or gas, subsea pipelines are commonly connected to production equipment or piping manifolds located above the surface of the water on a platform. A normal way of making such connection is through a vertical section of pipe, commonly referred to as a "riser". Frequently, the riser is damaged through corrosion, collision with ocean-going vessels, etc. The riser is most commonly damaged in the "splash zone" area near and just below the surface of the water.

The task of repairing a damaged riser, particularly one which is damaged below the surface of the water, is not a simple one. Such repairs have been commonly done by welding. However, welding techniques now employed require large amounts of labor and equipment.

In recent years, hydraulic couplings have been used to connect sections of pipe. However, such couplings require a source of pressurized hydraulic fluid and requires some means of maintaining engagement of the coupling with the pipe when the fluid pressure is relieved. For example, one coupling of the prior art utilizes epoxy resin as its fluid, allowing the resin to set in order to hold the coupling in its engaged position. Such setting procedures are complex and not totally reliable. Neither do they allow subsequent tightening of seals or easy removal of the coupling for repair or replacement. An example of such a coupling is shown in U.S. Pat. No. 3,393,926. Furthermore, such couplings have been normally designed for both tension and compression forces present in most pipeline situations, and are relatively complex for a riser installation where large reverse stresses are not prevalent.

Later couplings, such as the one shown in U.S. Pat. No. 3,999,782, have been developed to eliminate the problems inherent with hydraulically actuated couplings. Such couplings utilize totally mechanical means of actuation, eliminating much of the manpower and equipment required for other coupling means. However, such couplings have been primarily designed for both tension and compression forces and are relatively complex for repair of a damaged riser.

SUMMARY OF THE INVENTION

The connector or coupling apparatus of the present invention is especially designed for repairing damaged risers, and as designed, eliminates most of the problems associated with prior welding techniques, hydraulic connectors, and even totally mechanical connectors of the prior art. Like the connector of previously mentioned U.S. Pat. No. 3,999,782, the connector of the present invention is provided with a totally mechanical means of actuation. However, its means for gripping and sealing against the riser is simplified and more reliable. For example, the sealing means of the connector of the present invention assures complete and positive sealing and allows further sealing at a subsequent time, should such be required.

To accomplish the objectives of the connector of the present invention, it may be provided with: a tubular body connectible to an upper section of the riser and adapted to receive one end of a lower section of the riser; a gripping assembly carried by the body and movable from a radially expanded position, in which the end of the lower riser section may be axially received and displaced from the body, to a radially contracted position, gripping the exterior of the end of the lower riser section and preventing its axial displacement from the body; an annular seal assembly carried by the body and movable from a relaxed position, in which one end of the lower riser section may be axially received therein, to a compressed position, sealingly engaging the lower riser section; and an actuating assembly carried by the body and engageable with the gripping and seal assemblies for moving them to their contracted and compressed positions, respectively.

In using the connector of the present invention, the damaged riser is cut below its area of damage and prepared to receive the connector. A new section of pipe is provided to replace the removed section and the connector of the present invention is attached to the lower end thereof. The connector and upper section of riser are then lowered or stabbed over the upwardly projecting end of the remaining riser section until lowering is arrested by a stop shoulder within the connector. Then, an extendable sleeve assembly of the actuating assembly is extended to simultaneously apply oppositely directed axial forces for contracting the gripping assembly to grippingly engage the remaining riser section and for compressing the seal assembly to sealingly engage the remaining section so as to provide fluidtight fluid communication between the remaining old section and the upper replacement section.

Since the connector of the present invention is totally mechanical, it requires a minimum of manpower and equipment backup as compared to alternative methods, especially repair welding techniques. Its design permits easy removal, easy disassembly in the field, and numerous resettings and reuse. It also allows further application of sealing forces at a date subsequent to installation.

Many other objects and advantages of the present invention will be apparent from reading the description which follows in conjunction with the accompanying drawings.

DESCRIPTION OF A PREFERRED EMBODIMENT

Figure 1:
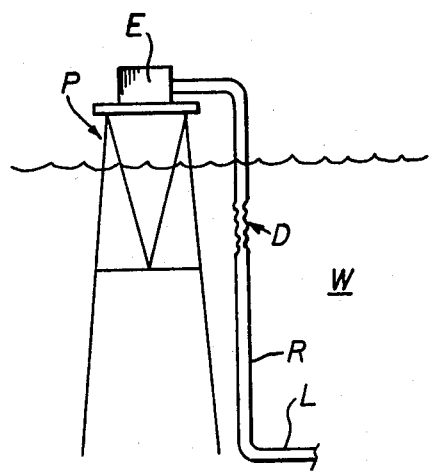
FIG. 1 is a schematic representation of an offshore platform to which a subsea pipeline is connected by a riser and illustrating damage to the riser.

Referring first to FIG. 1, there is shown an offshore oil and/or gas production platform P in a body of water W. The platform P may support processing equipment E, a pipe manifold or any other equipment normally supported on such a platform. A pipeline L is shown running along the floor of the body of water W from the base of the platform P to any desired location, such as an onshore facility, a subsea wellhead, etc. The pipeline L is connected to the equipment E on the platform P by a vertical pipe or riser R. As illustrated, the riser R is damaged at D just below the surface of the body of water W.

Figure 2:
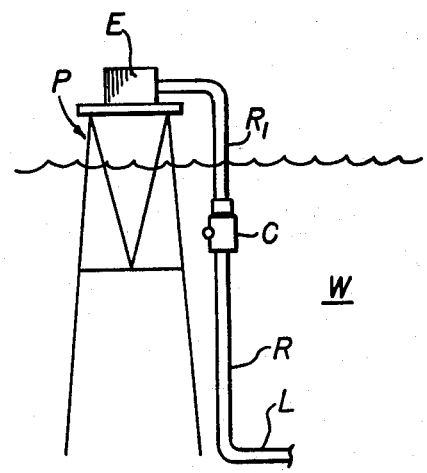
FIG. 2 is a schematic representation of the platform and riser of FIG. 1, showing the damaged riser repaired by installation of a connector according to the present invention.

As further illustrated in FIG. 2, the upper section of riser R, including the damaged area D, has been replaced by a new section of riser $R_1$, which is connected to the remaining portion of riser R by a connector C. The connector C is a mechanical coupling or connector, according to a preferred embodiment of the invention, which will be described hereafter.

Figure 4:
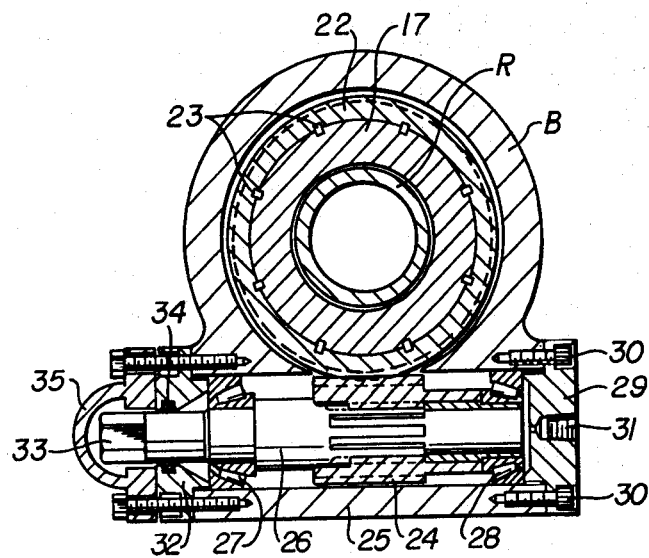
FIG. 4 is a horizontal section, taken along line 4—4 of FIG. 3, of the connector of the present invention.
Figures 3, 5:
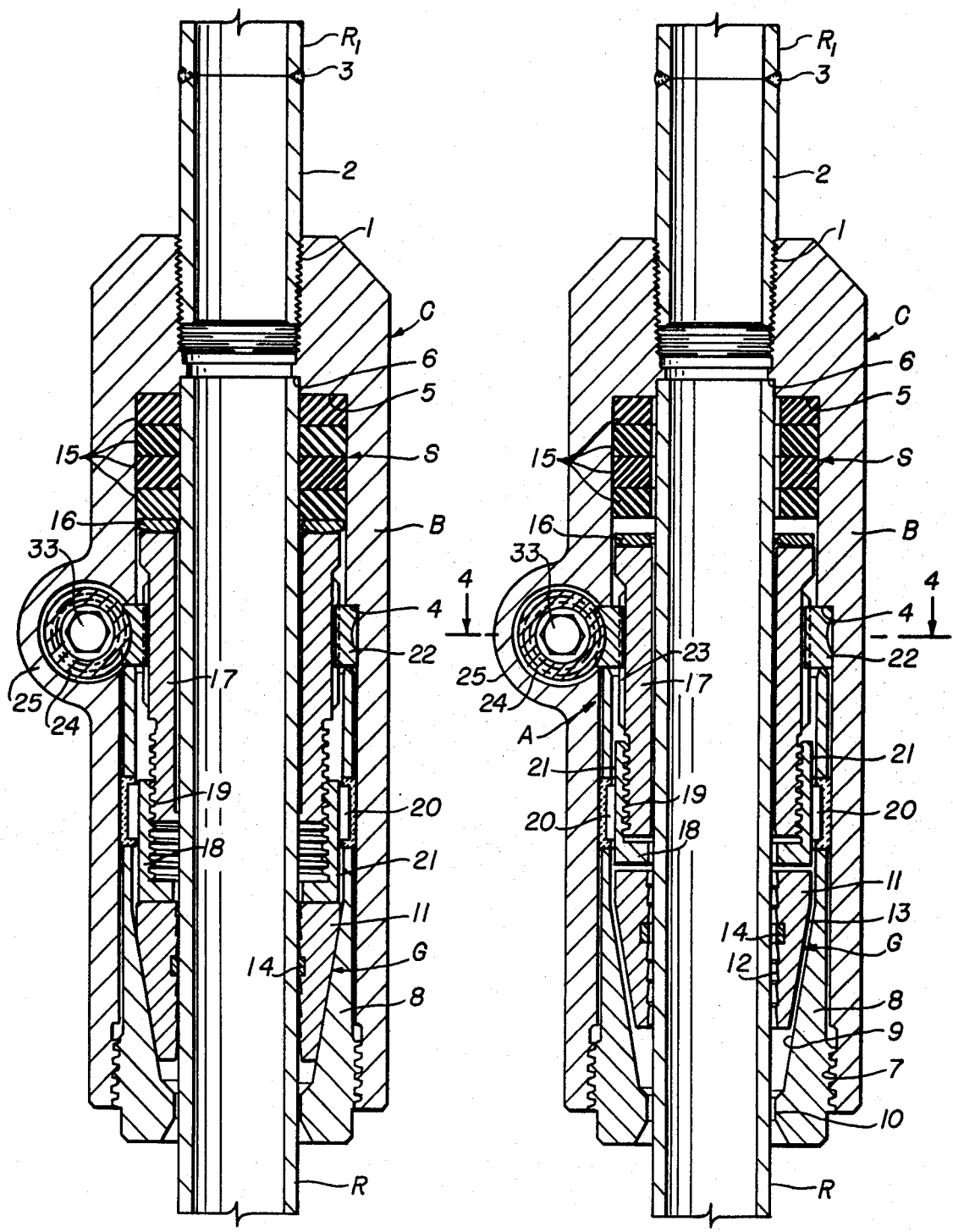
FIG. 3 is an elevation view, in section, of a connector according to a preferred embodiment of the invention, showing the connector in its initial or unset position.
FIG. 5 is an elevation view, in section, similar to FIG. 3 but showing the connector of the present invention in its engaged or set position.

Referring now to FIGS. 3 and 4, the connector C comprises a tubular body B, a gripping assembly G, seal assembly S and actuator assembly A, to be more fully described hereafter. The body B may be threaded at 1 to threadedly receive a new riser section $R_1$. If desired, a nipple 2 may be provided for welding to the new riser section $R_1$ such as at 3. The nipple 2 may be preinstalled with a sufficient length to keep the heat-affected zone of field welds safely away from the connector body B. Should a field weld prove unacceptable, it can be cut out below the weld zone on the nipple and remade. Should the nipple length be reduced unacceptably close to the body due to weld cutouts or multiple reuse of the tool, the nipple can be removed and replaced with a threaded length of compatible pipe.

The tubular body B is counterbored to provide annular shoulders 4, 5, and 6 of reducing diameters, the purposes of which will be more fully understood hereafter. As illustrated, the body B is adapted to receive the upwardly projecting end of riser R until the end of riser R is stopped against annular shoulder 6.

The lower end of the body B may be threaded, such as at 7, to threadedly receive a slip bowl 8 which makes up a portion of the gripping assembly G. The slip bowl 8 is generally cylindrical on its exterior and provided on its interior with a frusto-conical surface 9 converging toward the axis of riser R. The frusto-conical surface 9 may terminate at an inwardly projecting annular lip 10 which functions to prevent escape of slips 11. There are a plurality of such slips 11, made in a conventional manner, and having generally cylindrical inner faces 12 provided with some sort of friction engaging surface such as inclined teeth. The outer faces 13 of slips 11 are tapered to correspond with the tapered surface 9 of the slip bowl 8. The slips 11 are movable from a radially expanded position, as shown in FIG. 3, to a radially contracted position, as shown in FIG. 5, for gripping the exterior of riser R. As is understood in the art, by virtue of the mutually engaging tapered surfaces 9 and 13 of slip bowl 8 and slips 11, respectively, a downwardly directed axial force applied to the slips 11 will cause them to be contracted so as to engage the riser R, as shown in FIG. 5. To assure operation of all slips 11 in unison, a contractable ring 14 may be inserted in grooves provided therefor on the inner faces of the slips 11.

The seal assembly S may comprise a plurality of resilient annular seals 15 confined at one end by the annular shoulder 5 of body B and at the opposite end by a spacer ring 16, preferably of metal or some other hard material. As shown in FIG. 3, the seals 15 are in a relaxed position, permitting free insertion of the end of riser section R. As is understood in the art, an upwardly directed axial force applied to the spacer ring 16 will compress the resilient seal 15 so that their inner surfaces will sealingly engage the riser R such as is shown in FIG. 5.

The actuator assembly A is provided to move and actuate both the gripping assembly G and seal assembly S and includes a sleeve assembly which may comprise a rotating sleeve or drive member 17 and a non-rotating sleeve or thrust collar 18, connected by mutually engaging threads 19. The sleeve assembly 17 and 18 is disposed within the body between the gripping assembly G and seal assembly S. As can be understood, relative rotation of the drive sleeve 17 in the proper direction will cause the sleeve assembly to be extended by the unthreading of thrust sleeve 18 from drive sleeve 17. Conversely, rotation of the drive sleeve 17 in the opposite direction will cause the sleeve assembly 17 and 18 to be retracted. It will be understood that upon extension of the sleeve assembly 17 and 18, oppositely directed forces would be applied to the gripping assembly G and seal assembly S tending to move them toward the contracted and compressed positions, respectively, of FIG. 5.

To prevent rotation of the thrust sleeve 18, keys 20 may be welded to the slip bowl 8 for engaging cooperating longitudinal keyways 21 machined along the exterior of the thrust sleeves 18. Thus, rotation of the thrust sleeve 18 is prevented but at least some degree of axial movement is permitted.

To supply the necessary rotation of drive sleeve 17, a worm and worm wheel arrangement is provided to complete the actuator assembly A. As shown, the worm wheel 22 surrounds drive sleeve 17 and is confined between annular shoulder 4 of body B and the upper end of slip bowl 8. The worm wheel 22 is attached to the drive sleeve 17 by longitudinal splines 23 on the drive sleeve 17 slidingly engaging corresponding splineways on the interior of worm wheel 22. Thus, no relative rotation is permitted between the drive sleeve 17 and worm wheel 22, yet some degree of relative axial displacement is permitted.

To rotate the worm wheel 22 and consequently the drive sleeve 17, a mating worm 24, having its axis perpendicular to the axis of body B, is provided. As best seen in FIG. 4, a cylindrical worm housing 25 may be welded to the side of the body B to accommodate the worm 24 and other necessary components therefor. The worm 24 may be mounted on a splined shaft 26 which preferably rotates on roller bearings 27 and 28. One end of the worm housing 25 may be closed by a blind cap flange 29, with suitable cap screws 30, which may be provided with a pluggable port 31 through which the worm housing may initially be filled with a lubricating fluid.

The opposite end of the worm housing 25 may be provided with an open cap flange 32, through which an engageable end 33 of the shaft 26 may project. An annular seal 34 may be provided around the opening of the cap 32. As will be easily understood, engagement of the shaft 26 at 33 by an operating wheel, a manual wrench, a hydraulic wrench or any other suitable tool, and rotation thereof, will in turn cause rotation of worm wheel 22 and drive sleeve 17, extension of the sleeve assembly 17 and 18 and actuation of the gripping assembly G and seal assembly S. After operation of the connector, the hand wheel wrench or other tool may be removed from the engagement end 33 of shaft 26 and a protective enclosure or cover 35 installed to protect the actuator assembly A from the hostile environment in which the connector will be used.

STATEMENT OF OPERATION

Referring now to all drawings, operation of the present invention and its method of use will be described, initially the damaged riser R is cut below the damaged area D and the upwardly projecting end of the remaining riser section R is prepared by thoroughly removing any protective coating or marine growth and grinding flush any longitudinal and radial welds for a longitudinal distance equal to the internal length of the connector C. Then a new riser section or stalk $R_1$ is welded to the nipple 2 of the connector C, taking into account the length and swallow characteristics of the connector C. With the connector C in the open or unset position of FIG. 3, the new riser stalk $R_1$ and connector C are lowered and stabbed over the old riser R, bottoming out the cut end of the riser R at the stop shoulder 6.

The tool is then set by applying a turning torque to worm shaft 26, the worm 24 in turn imparting rotation to the worm wheel 22 and drive sleeve 17. As the drive sleeve 17 rotates, generally in place, the thrust sleeve 18 is unscrewed extending the sleeve assembly and applying a setting force against the gripping assembly G. As the slips 11 begin to engage the riser R, they present a resistance to the thrust sleeve 18 which causes the drive sleeve 17 to shift upwardly away from the resistance and begin exerting a compressive force on the seal rings 15 through spacer ring 16.

A build-up of compressive force in the seal rings 15 creates a resistance to the upward exertion of the drive sleeve 17. When this resistance exceeds that presented by the slips 11, further rotation of the drive sleeve 17 causes the thrust sleeve 18 to resume applying a setting force against the slips 11. When the resistance of the slips 11 exceeds that of the seals 15, the direction of applied force shifts again from the slips 11 to the seal rings 15. This procedure continues until further force application to the slips 11 results in no further slip movement. The slips are now firmly set, wedged securely between the slip bowl 8 and the riser R. From this point onward, all further setting torque applied to the actuating assembly A results in increased compression of the seal rings 15. This feature allows further sealing at a future date by merely applying setting torque externally, requiring a minimum of mechanical assistance.

The connector C finally assumes the set position of FIG. 5, providing fluidtight communication between the riser R and the new riser section or stalk $R_1$. Should the riser again be damaged in the same general area, the tool can be recovered, field re-conditioned and reused in the repair. Removal is effected simply by rotating the worm shaft in the opposite direction.

CONCLUSION

From the foregoing description, it can be seen the connector apparatus of the present invention is a definite improvement over those of the prior art. It is relatively simple to manufacture and install. It offers a great deal of flexibility in installation, seal retightening, removal, field disassembly and reuse. Although only one embodiment of the invention has been described herein, many variations can be made by those skilled in the art without departing from the spirit of the invention. Accordingly, it is intended that the scope of the invention be limited only by the claims which follow.

I claim:

1. A method of repairing a damaged pipe riser extending upwardly through a body of water to a well platform or the like comprising the steps of:
   removing a first section of said pipe riser by cutting below the damaged area of said riser to leave a second section therebelow;
   providing a third section of pipe, to replace said first section, with a connector attached to the lower end thereof, said connector being provided with gripping means, seal means and axially extendable and retractable sleeve means therebetween;
   lowering said connector on said third section of pipe so as to receive the upwardly projecting end of said second riser section until lowering is arrested by stop means within said connector;
   extending said sleeve means to simultaneously apply oppositely directed axial forces for contracting said gripping means to grippingly engage said second section and for compressing said seal means to sealingly engage said second section so as to provide fluidtight communication between said second and third riser sections.

2. The method of claim 1 in which said sleeve means is extended until further contraction of said gripping means is precluded; then further extending said sleeve means to further compress said seal means.

3. The method of claim 1 and the subsequent steps of:
   retracting said sleeve means to disengage said gripping means from said second riser section; and
   raising said third riser section and attached connector for repair or replacement of said connector or said third riser section.

* * * * *